US009902237B2

(12) United States Patent
Sano et al.

(10) Patent No.: US 9,902,237 B2
(45) Date of Patent: Feb. 27, 2018

(54) VEHICLE WIND DIRECTION ADJUSTER

(71) Applicant: NIHON PLAST CO., LTD., Shizuoka (JP)

(72) Inventors: Toru Sano, Shizuoka (JP); Nobuaki Uehara, Shizuoka (JP); Shohei Uchikawa, Shizuoka (JP)

(73) Assignee: NIHON PLAST CO., LTD., Shizuoka (JP)

( * ) Notice: Subject to any disclaimer, the term of this patent is extended or adjusted under 35 U.S.C. 154(b) by 107 days.

(21) Appl. No.: 14/943,762

(22) Filed: Nov. 17, 2015

(65) Prior Publication Data
US 2016/0137034 A1  May 19, 2016

(30) Foreign Application Priority Data

Nov. 18, 2014 (JP) ................. 2014-233343

(51) Int. Cl.
*B60H 1/34* (2006.01)
(52) U.S. Cl.
CPC ................. *B60H 1/3442* (2013.01)
(58) Field of Classification Search
CPC .................................................. B60H 1/3442
USPC .......................................................... 454/154
See application file for complete search history.

(56) References Cited

U.S. PATENT DOCUMENTS

| 4,750,410 A * | 6/1988 | Parker ...................... B60H 1/34 454/155 |
| 5,399,119 A * | 3/1995 | Birk ...................... B60H 1/3442 454/286 |
| 5,746,651 A * | 5/1998 | Arajs ................... B60H 1/3442 454/154 |
| 6,645,065 B2 * | 11/2003 | Rooney ................ B60H 1/3442 454/154 |
| 2002/0028651 A1 * | 3/2002 | Shigeno .............. B29C 45/0017 454/155 |
| 2003/0157880 A1 * | 8/2003 | Nishida ................ B60H 1/3414 454/155 |
| 2011/0088310 A1 * | 4/2011 | Parker .................. A01M 1/2011 43/131 |
| 2011/0250830 A1 * | 10/2011 | Steinbeiss ............ B60H 1/3442 454/154 |

(Continued)

FOREIGN PATENT DOCUMENTS

JP  2014-091377 A  5/2014

*Primary Examiner* — Steven B McAllister
*Assistant Examiner* — Jonathan Cotov
(74) *Attorney, Agent, or Firm* — Brundidge & Stanger, P.C.

(57) ABSTRACT

A vehicle wind direction adjuster includes: a case having a cylindrical shape; a housing having a cylindrical shape and turnably coupled to the case through a universal joint; and a louver provided in the housing, wherein: the universal joint includes a shaft member having a first shaft and a second shaft orthogonal to the first shaft, a first turning supporter coupled to the case and configured to turnably support the first shaft, and a second turning supporter coupled to the housing and configured to turnably support the second shaft; an first elastic body is provided around the first shaft such that the first elastic body is interposed between the shaft member and the first turning supporter; and an second elastic body is provided around the second shaft such that the second elastic body is interposed between the shaft member and the second turning supporter.

3 Claims, 8 Drawing Sheets

(56) References Cited

U.S. PATENT DOCUMENTS

| | | | |
|---|---|---|---|
| 2013/0005233 A1* | 1/2013 | Park | B60H 1/3421 454/155 |
| 2014/0120823 A1* | 5/2014 | Brinas | B60H 1/34 454/155 |
| 2015/0031278 A1* | 1/2015 | Kim | B60H 1/3421 454/152 |
| 2015/0202946 A1* | 7/2015 | Inagaki | B60H 1/3428 454/154 |

* cited by examiner

VEHICLE WIND DIRECTION ADJUSTER

CROSS REFERENCE TO RELATED APPLICATION

This application is entitled to the benefit of Japanese Patent Application No. 2014-233343 filed on Nov. 18, 2014, the disclosure of which including the specification, drawings and abstract is incorporated herein by reference in its entirety.

TECHNICAL FIELD

The present invention relates to a vehicle wind direction adjuster.

BACKGROUND ART

Conventionally, vehicle wind direction adjusters have been publicly known (see, for example, PTL 1).

The vehicle wind direction adjuster disclosed in Patent Literature (hereinafter referred to as PTL) 1 includes a cylindrical case, a cylindrical housing turnably coupled to the case through a ball joint, and a louver provided in the housing. By coupling the case and the housing through the ball joint, the housing having the louver therein can be turned 360 degrees.

CITATION LIST

Patent Literature

PTL 1
Japanese Patent Application Laid-Open No. 2014-91377

SUMMARY OF INVENTION

Technical Problem

In the vehicle wind direction adjuster disclosed in PTL 1, the entire surface of the ball of the ball joint is covered with an elastic body in order to improve operation feeling in the turning operation. With such a configuration, it is difficult to ensure intended operation feeling when the shape of the ball of the ball joint, or the thickness of the elastic body that covers the ball are not uniform over the entire surface. In particular, it is difficult to satisfy a demand for changing the operation feeling for each of a vertical operation and a horizontal operation.

Under such a circumstance, an object of the present invention is to provide a vehicle wind direction adjuster in which operation feeling can be changed for each of a vertical operation and a horizontal operation and thus operation feeling in a turning operation can be improved.

Solution to Problem

A vehicle wind direction adjuster according to an embodiment of the present invention includes: a case having a cylindrical shape; a housing having a cylindrical shape and turnably coupled to the case through a universal joint; and a louver provided in the housing. The universal joint includes a shaft member having a first shaft and a second shaft orthogonal to the first shaft, a first turning supporter coupled to the case and configured to turnably support the first shaft, and a second turning supporter coupled to the housing and configured to turnably support the second shaft. A first elastic body is provided around the first shaft such that the first elastic body is interposed between the shaft member and the first turning supporter; and a second elastic body is provided around the second shaft such that the second elastic body is interposed between the shaft member and the second turning supporter.

Advantageous Effects of Invention

In the vehicle wind direction adjuster according to the embodiment of the present invention, the coupling part between the case and the housing is a universal joint. In addition, the first shaft is inserted to the first elastic body such that the shaft member and the first turning supporter make sliding contact with each other through first elastic body, and in addition, the second shaft is inserted to the second elastic body such that the shaft member and the second turning supporter make sliding contact with each other through the second elastic body. Since the hardness and the like of the elastic bodies can be set for each of the shafts, operation feeling can be changed for each of the vertical operation and the horizontal operation. Accordingly, with the vehicle wind direction adjuster according to the embodiment of the present invention, operation feeling can be changed for each of the vertical operation and the horizontal operation, and thus the operation feeling in a turning operation can be improved.

DESCRIPTION OF EMBODIMENTS

In the following, an embodiment of the present invention is specifically described with reference to the accompanying drawings.

It is to be noted that, in the drawings, arrow X indicates the horizontal direction (vehicle width direction), and arrow Y indicates the vertical direction (vehicle height direction).

The vehicle wind direction adjuster according to the present embodiment is an apparatus that is configured to adjust the wind direction and is provided at an air outlet of an air-conditioner of a vehicle such as an automobile, for example. This vehicle wind direction adjuster is also called ventilator, register or the like, and is installed in an opening part provided in an instrument panel, a center console, or the like, for example.

Figure 1:
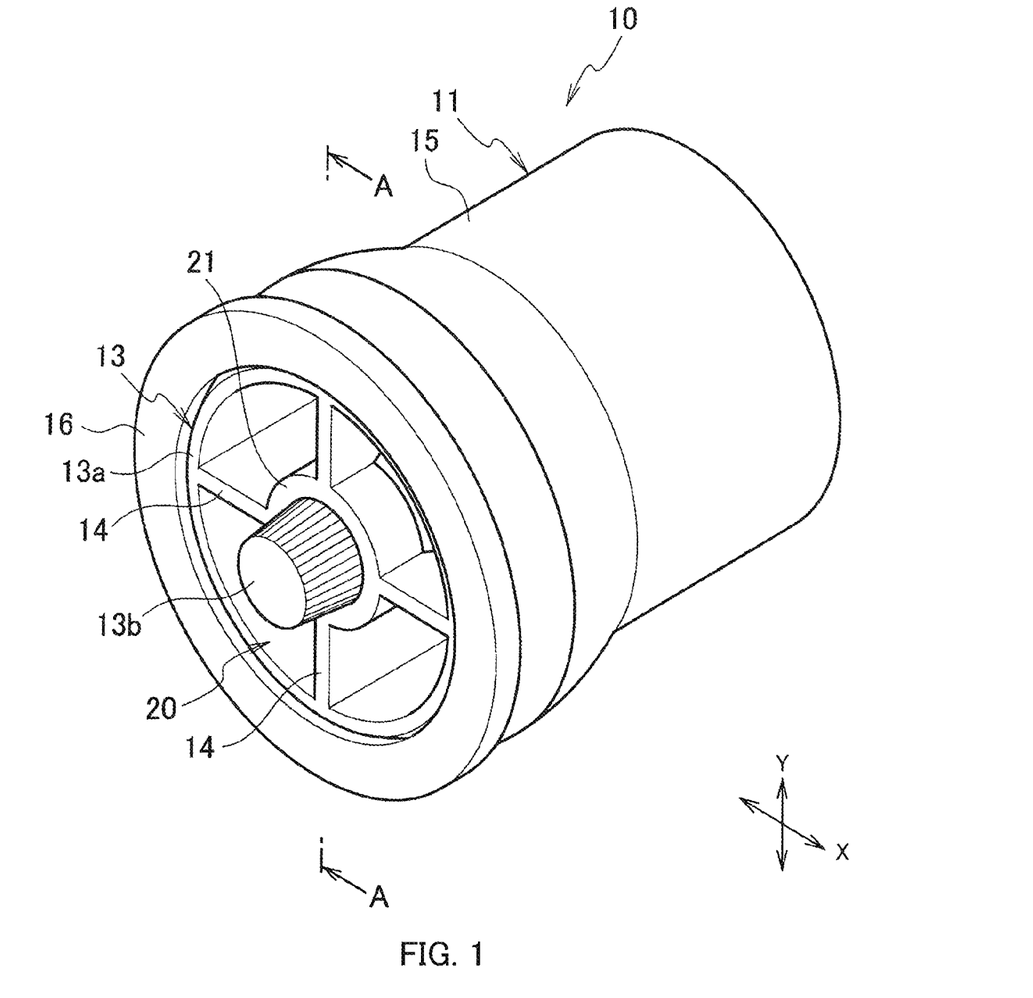
FIG. 1 is a perspective view of a vehicle wind direction adjuster according to an embodiment of the present invention.
Figure 2:
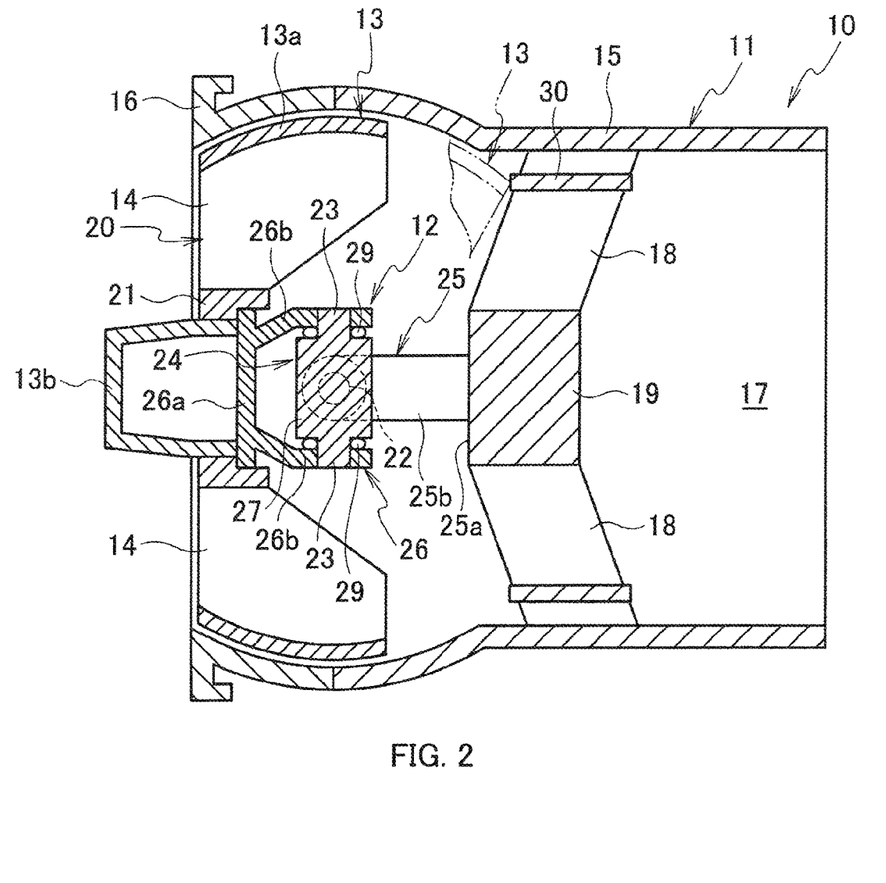
FIG. 2 is a sectional view taken along line A-A of FIG. 1.
Figure 3:
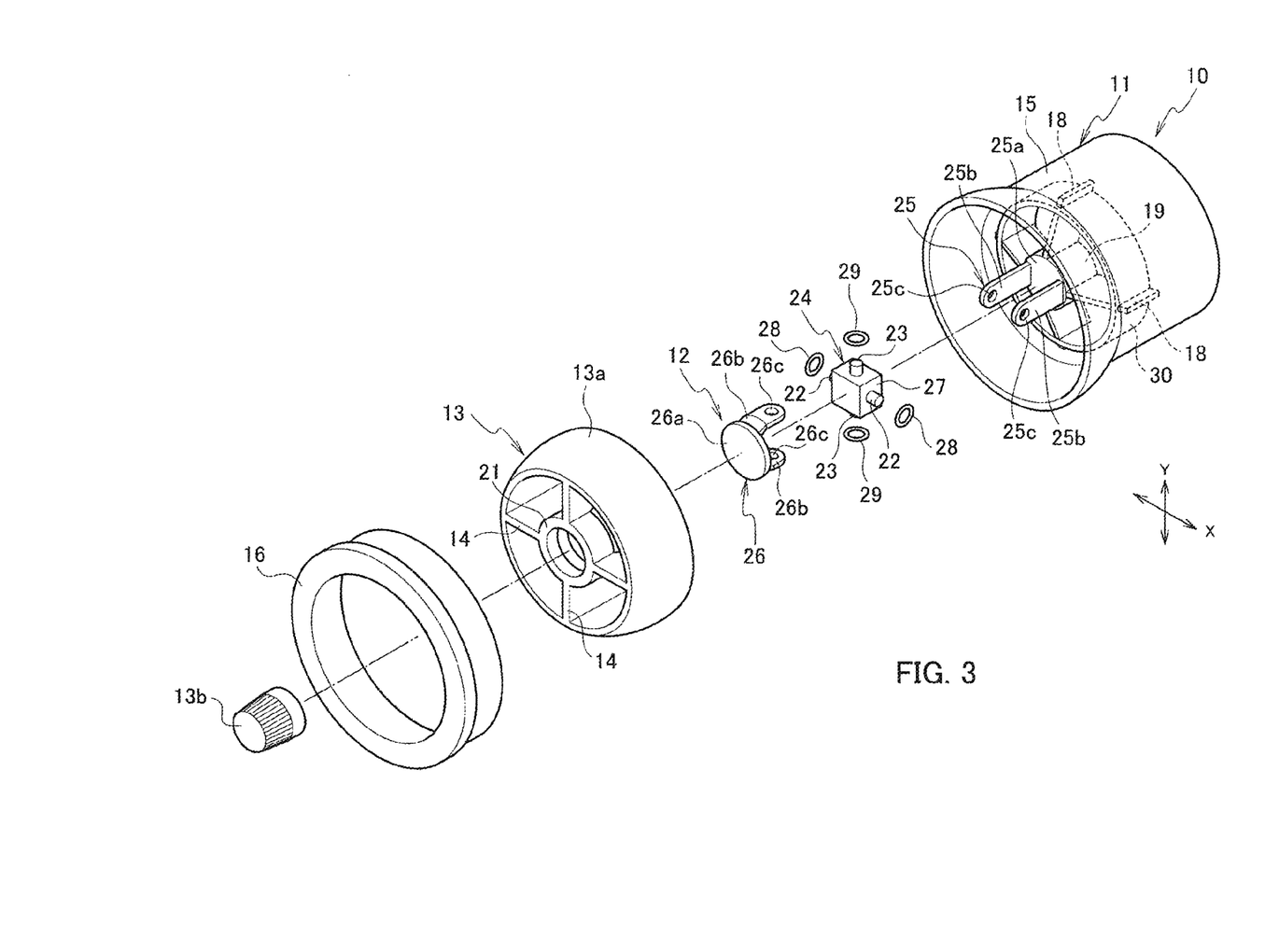
FIG. 3 is an exploded perspective view of the vehicle wind direction adjuster of FIG. 1.

As illustrated in FIG. 1 to FIG. 3, vehicle wind direction adjuster 10 is a so-called round-shaped wind direction adjuster. Vehicle wind direction adjuster 10 includes cylindrical case 11, cylindrical housing 13 that is turnably coupled to case 11 through two-shaft universal joint 12, and louver (fin) 14 provided in housing 13. Louver 14 adjusts the direction of air (wind direction) that is blown out to the vehicle interior from air outlet 20 described later.

Case 11 mainly includes case main body 15, and finisher 16 attached at an end portion of case main body 15. Inside case main body 15, air passage 17 for bringing the air from an air-conditioner (not illustrated) from one end side (right side in FIG. 2) to the other end side (left side in FIG. 2) is formed. Inside case main body 15, coupling rib 18 extending toward the radially outside (radial direction of case main body 15) is integrally formed, and first supporting part 19 that supports first turning supporter 25 described later is formed at the center of coupling rib 18. Finisher 16 serves as a part of the design surface of the attachment position of vehicle wind direction adjuster 10, and is detachably attached on case main body 15 at an end portion on the other end side. Case 11 is formed of a synthetic resin material (such as an ABS resin and a PP resin) for example.

Housing 13 includes cylindrical housing main body 13a whose outer diameter is slightly smaller than the internal diameters of case main body 15 and finisher 16, and air outlet 20 for blowing out air to the vehicle interior opens at a front end portion of housing main body 13a. Inside housing 13, louver 14 extending toward the radially outside (radial direction of housing 13) is integrally formed, and second supporting part 21 that supports second turning supporter 26 described later is formed at the center of louver 14. In addition, operation nob 13b is attached at a front end portion of second supporting part 21. Housing 13 is formed of a synthetic resin material (such as an ABS resin and a PP resin) for example.

Universal joint 12 includes shaft member (spacer) 24 having first shaft 22 and second shaft 23 orthogonal to first shaft 22, first turning supporter 25 that is coupled to case (case main body 15) so as to turnably support first shaft 22, and second turning supporter 26 that is coupled to housing 13 so as to turnably support second shaft 23. Universal joint 12 is formed of a synthetic resin material (such as polyacetal) for example.

As illustrated in FIG. 3, shaft member 24 includes main body block 27, first shaft 22 integrally formed on the left and right surfaces of main body block 27, and second shaft 23 integrally formed on the upper and lower surfaces of main body block 27. In vehicle wind direction adjuster 10 according to the present embodiment, first shaft 22 extends in horizontal direction X, and is a rotational shaft (vertical rotational shaft) that serves as a rotational center of turning of housing 13 in the vertical direction. On the other hand, second shaft 23 extends in vertical direction Y, and is a rotational shaft (horizontal rotational shaft) that serves as a rotational center of turning of housing 13 in the horizontal direction. Alternatively, it is possible to adopt a configuration in which first shaft 22 extends in vertical direction Y and second shaft 23 extends in horizontal direction X unlike vehicle wind direction adjuster 10 according to the present embodiment.

As illustrated in FIG. 3, first turning supporter 25 includes base part 25a, and a pair of plate-shaped extending parts 25b provided on base part 25a with a space in horizontal direction X therebetween and extending from base part 25a to main body block 27 side, and thus first turning supporter 25 has a U-shape. Hole 25c through which an end portion of first shaft 22 is inserted is provided in extending part 25b such that hole 25c penetrates extending part 25b. One end (base part 25a) of first turning supporter 25 is coupled to first supporting part 19 of case main body 15, and the other end (extending part 25b) thereof is coupled to first shaft 22 of shaft member 24. While first turning supporter 25 is integrated with first supporting part 19 of case main body 15 in the example illustrated in the drawing, first turning supporter 25 may be separated from case main body 15.

As illustrated in FIG. 3, second turning supporter 26 includes base part 26a and a pair of plate-shaped extending parts 26b provided on base part 26a with a space in vertical direction Y therebetween and extending from base part 26a to main body block 27 side, and thus second turning supporter 26 has a has a U-shape. Hole 26c through which an end portion of second shaft 23 is inserted is provided in extending part 26b such that hole 26c penetrates extending part 26b. One end (extending part 26b) of second turning supporter 26 is coupled to second shaft 23 of shaft member 24, and the other end (base part 26a) thereof is coupled to second supporting part 21 of housing 13. While second turning supporter 26 is separated from second supporting part 21 of housing 13 in the example illustrated in the drawing, second turning supporter 26 may be integrated with housing 13.

First shaft 22 (vertical rotational shaft) is inserted to annular first elastic body 28, and first elastic body 28 is interposed between each of left and right surfaces of main body block 27 of shaft member 24 and the inner surface of extending part 25b of first turning supporter 25. When housing 13 is turned in vertical direction Y, shaft member 24 and first turning supporter 25 make sliding contact with each other via first elastic body 28, and thus adequate operation torque is generated between shaft member 24 and first turning supporter 25. In this manner, operation feeling of housing 13 in a vertical operation can be improved. First elastic body 28 is formed of a synthetic resin material (such as silicon and elastomer) for example. It is to be noted that the shape of first elastic body 28 is not limited to the annular shape, and first elastic body 28 may have a square-annular shape or the like. In addition, first elastic body 28 may not have a complete annular shape, and may have a partially disconnected shape.

On the other hand, second shaft 23 (horizontal rotational shaft) is inserted to annular second elastic body 29, and second elastic body 29 is interposed between each of the upper and lower surfaces of main body block 27 of shaft member 24 and the inner surface of extending part 26b of second turning supporter 26. When housing 13 is turned in horizontal direction X, shaft member 24 and second turning supporter 26 make sliding contact with each other via second elastic body 29, and thus adequate operation torque is generated between shaft member 24 and second turning supporter 26. In this manner, operation feeling of housing 13 in a horizontal operation can be improved. Second elastic body 29 is formed of a synthetic resin material (such as silicon and elastomer) for example. It is to be noted that the shape of second elastic body 29 is not limited to the annular shape, and second elastic body 29 may have a square-annular shape or the like. In addition, second elastic body 29 may not have a complete annular shape, and may have a partially disconnected shape.

In vehicle wind direction adjuster 10 according to the present embodiment, first elastic body 28 and second elastic body 29 have different hardnesses and compression allowances. By setting first elastic body 28 and second elastic body 29 to have different hardnesses and compression allowances, the operation feeling can be readily changed for each of the vertical operation and the horizontal operation. For example, when the hardness of first elastic body 28 through which first shaft 22 is inserted is set to a value greater than the hardness of second elastic body 29 through which second shaft 23 is inserted, the operation torque in the vertical operation can be set to a torque greater than that of the horizontal operation. In addition, when the compression allowance of first elastic body 28 is set to a value greater than that of second elastic body 29, the operation torque in the vertical operation can be set to a torque greater than that of the horizontal operation.

Figure 6:
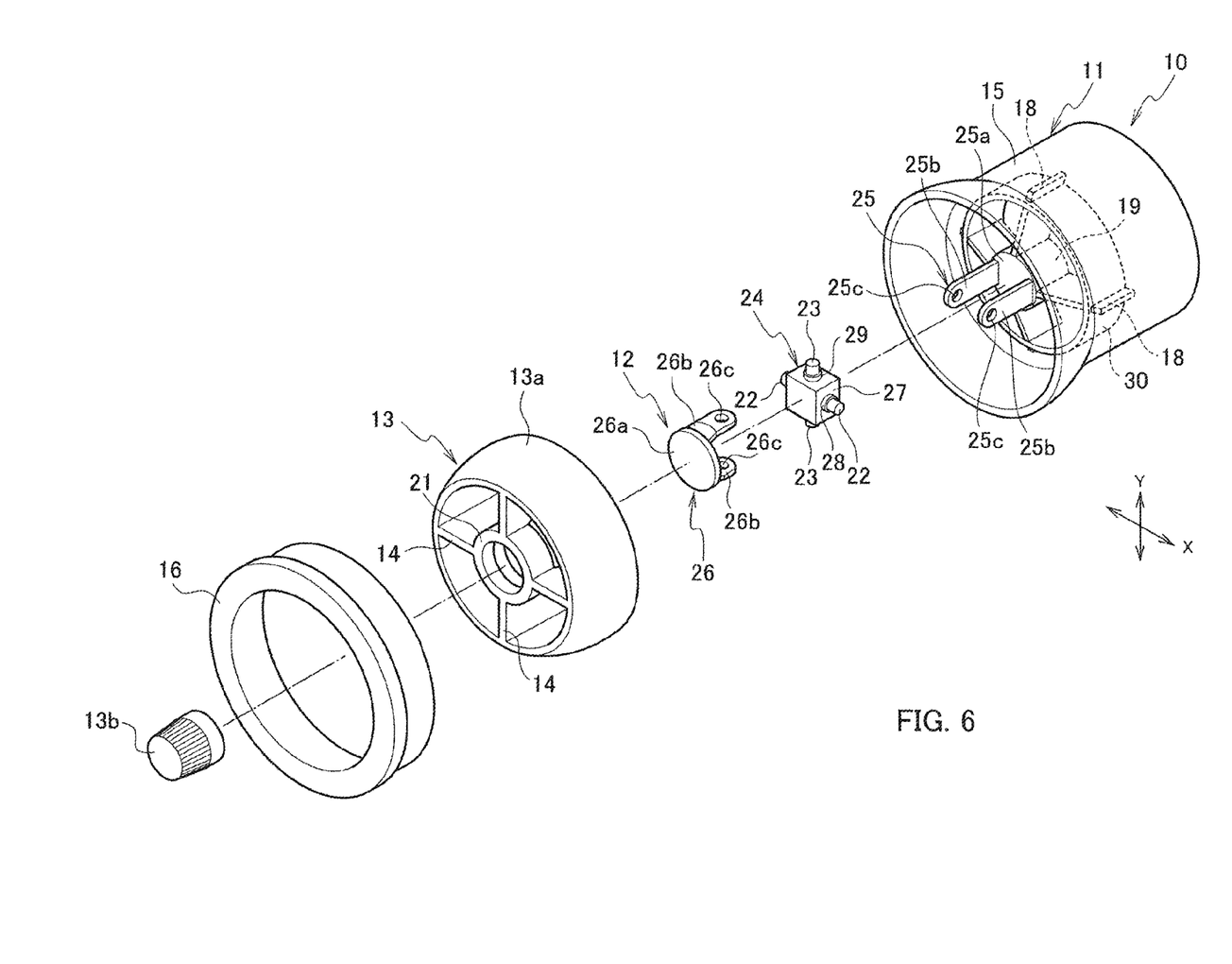
FIG. 6 is an exploded perspective view of a vehicle wind direction adjuster according to another embodiment of the present invention.

In vehicle wind direction adjuster 10 according to the present embodiment, first elastic body 28 and second elastic body 29 are formed separately from shaft member 24 as illustrated in FIG. 3. Alternatively, first elastic body 28 and second elastic body 29 may be formed integrally with shaft member 24 by multicolor molding as illustrated in FIG. 6.

As illustrated in FIG. 3, vehicle wind direction adjuster 10 further includes turning angle restriction part (turning angle restriction member) 30 that restricts the turning angle of housing 13 to a predetermined angle.

Turning angle restriction part 30 is formed in a cylindrical shape, and is integrally formed in the middle of coupling rib 18. That is, turning angle restriction part 30 is extended flush over the whole circumference of case 11. In addition, a predetermined gap is provided between the outer peripheral surface of turning angle restriction part 30 and the inner peripheral surface of case 11 (case main body 15), and thus air is allowed to pass through the space between the outer peripheral surface of turning angle restriction part 30 and the inner peripheral surface of case 11.

Figure 7:
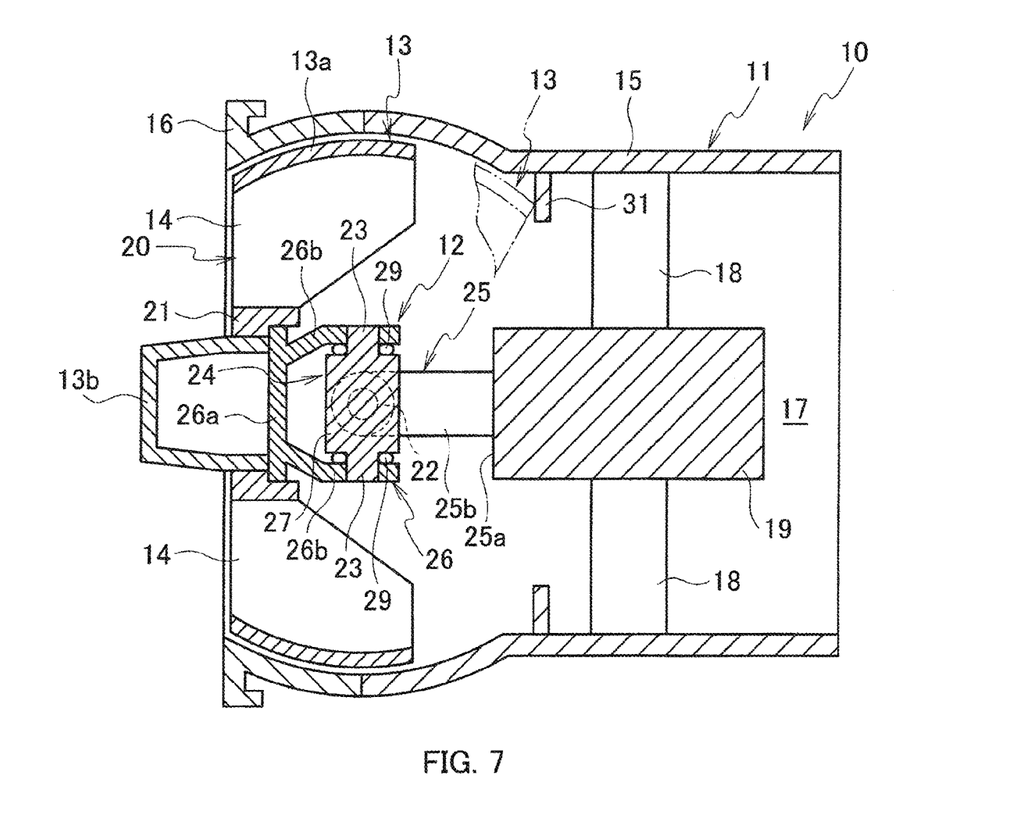
FIG. 7 is a side sectional view of the vehicle wind direction adjuster illustrating a modification of the turning angle restriction part.
Figure 8:
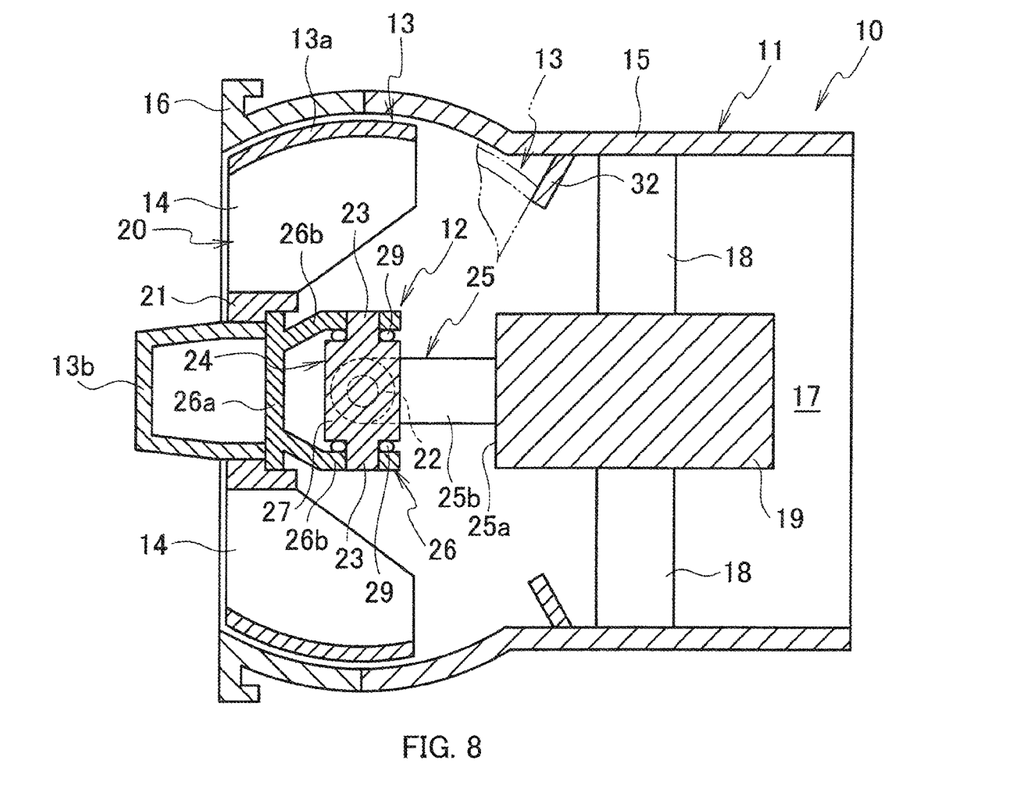
FIG. 8 is a side sectional view of the vehicle wind direction adjuster illustrating a modification of the turning angle restriction part.

It is to be noted that the turning angle restriction part is not limited to the present embodiment as long as the turning angle restriction part is extended flush over the whole circumference of case. For example, turning angle restriction part 31 may be formed in a circular plate shape as illustrated in FIG. 7, or turning angle restriction part 32 that tilts to air outlet 20 side as it goes toward the radially inside of case 11 may be formed in a circular plate shape as illustrated in FIG. 8.

Next, the operation of vehicle wind direction adjuster 10 according to the present embodiment is described.

As illustrated in FIG. 1, when housing 13 is set at a neutral position, that is, when the central axis of housing 13 is aligned with the central axis of case 11, louver 14 is set such that the wind axis is parallel to the central axis of case 11 in vehicle wind direction adjuster 10. With this configuration, when housing 13 is set at a neutral position, the air blown out from air outlet 20 flows straight toward the front.

Figure 4:
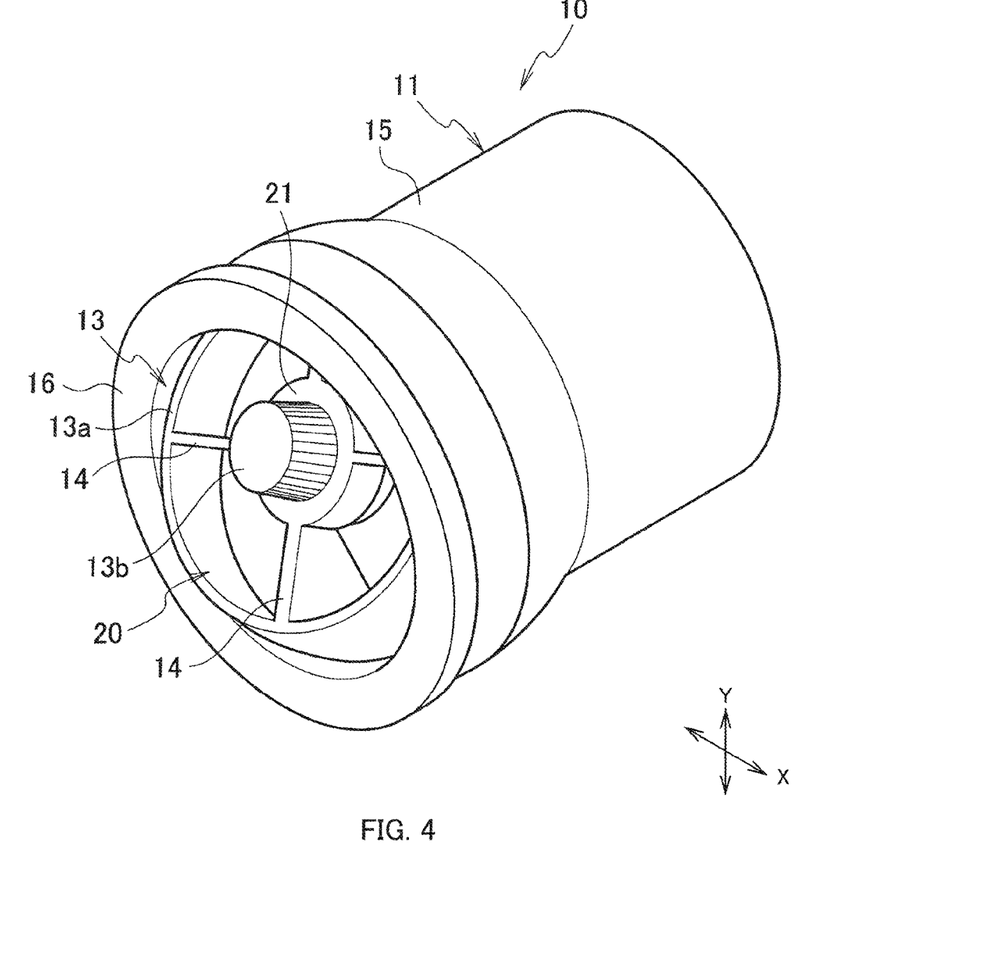
FIG. 4 a perspective view of the vehicle wind direction adjuster of FIG. 1 in a vertical operation.

When housing 13 is turned in vertical direction Y from a neutral position as illustrated in FIG. 4, housing 13 turns about first shaft 22 (vertical rotational shaft) of universal joint 12. At this time, the wind axis of louver 14 provided in housing 13 is tilted in vertical direction Y relative to the central axis of case 11, and air deflected in vertical direction Y can be blown out from air outlet 20.

Figure 5:
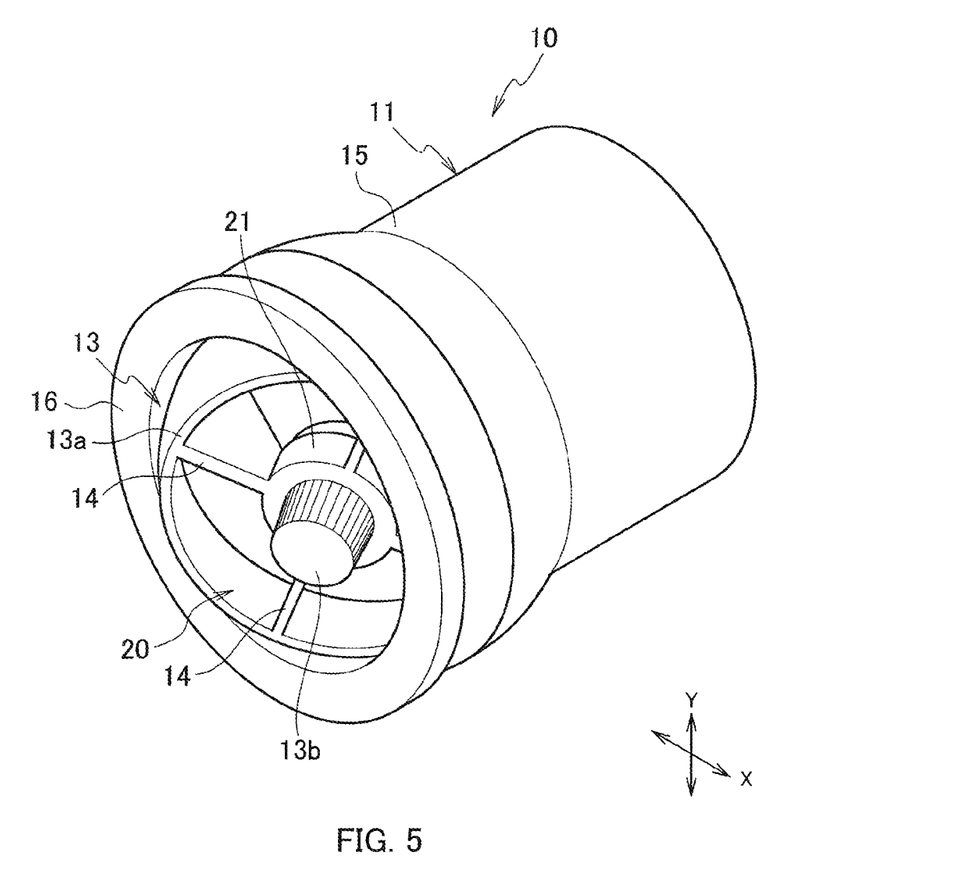
FIG. 5 is a perspective view of the vehicle wind direction adjuster of FIG. 1 in a horizontal operation.

When housing 13 is turned in horizontal direction X from a neutral position as illustrated in FIG. 5, housing 13 turns about second shaft 23 (horizontal rotational shaft) of universal joint 12. At this time, the wind axis of louver 14 provided in housing 13 is tilted in horizontal direction X relative to the central axis of case 11, and air deflected in horizontal direction X can be blown out from air outlet 20.

By appropriately combining the operation of turning housing 13 in vertical direction Y and the operation of turning housing 13 in horizontal direction X, housing 13 provided with louver 14 therein can be turned 360 degrees.

Since turning angle restriction part 30 is extended flush over the whole circumference of case 11 as illustrated in FIG. 2 and FIG. 3, the end portion of housing 13 makes contact with turning angle restriction part 30 at the same angle whenever housing 13 is turned regardless of the position in 360 degrees. With this configuration, the control angle (maximum turning angle) of housing 13 can be set to a constant angle regardless of the turning position.

In addition, when turning angle restriction part 30 is formed in a cylindrical shape as illustrated in FIG. 2 and FIG. 3, a space through which air flows can be provided between the outer peripheral surface of turning angle restriction part 30 and the inner peripheral surface of case 11. With this configuration, the influence of turning angle restriction part 30 on the ventilation resistance is small, and stable wind direction adjusting performance can be ensured.

In the following, the effects of the present embodiment are described.

(1) A vehicle wind direction adjuster 10 according to the present embodiment includes: case 11 having a cylindrical shape; housing 13 having a cylindrical shape and turnably coupled to case 11 through a universal joint 12; and louver 14 provided in housing 13. Universal joint 12 includes shaft member 24 having first shaft 22 and second shaft 23 orthogonal to first shaft 22, first turning supporter 25 coupled to case 11 and configured to turnably support first shaft 22, and second turning supporter 26 coupled to housing 13 and configured to turnably support second shaft 23. First elastic body 28 having an annular shape is provided around first shaft 22 such that first elastic body 28 is interposed between shaft member 24 and first turning supporter 25, and second elastic body 29 having an annular shape is provided around second shaft 23 such that second elastic body 29 is interposed between shaft member 24 and second turning supporter 26.

In vehicle wind direction adjuster 10 according to the embodiment of the present embodiment, a two-shaft universal joint (universal joint) 12 is adopted as a coupling part between case 11 and housing 13. In addition, first shaft 22 is inserted to annular first elastic body 28 such that shaft member 24 and first turning supporter 25 make sliding contact with each other through first elastic body 28. Further, second shaft 23 is inserted to annular second elastic body 29 such that shaft member 24 and second turning supporter 26 make sliding contact with each other through second elastic body 29. The hardness and the like of each of elastic bodies 28 and 29 can be set for each of shafts 22 and 23, and therefore the operation feeling can be changed for each of the vertical operation and the horizontal operation.

With vehicle wind direction adjuster 10 according to the embodiment of the present embodiment, the operation feeling can be changed for each of the vertical operation and the horizontal operation, and consequently the operation feeling in the turning operation can be improved.

(2) In vehicle wind direction adjuster 10 according to the present embodiment, first elastic body 28 and second elastic body 29 have different hardnesses or compression allowances.

By setting first elastic body 28 and second elastic body 29 to have different hardnesses or compression allowances, operation feeling can be readily changed for each of the vertical operation and the horizontal operation.

(3) In vehicle wind direction adjuster 10 according to the present embodiment, each of shaft member 24, first elastic body 28 and second elastic body 29 is formed of a synthetic resin material, and first elastic body 28 and second elastic body 29 are formed integrally with shaft member 24 by multicolor molding.

By forming first elastic body 28 and second elastic body 29 integrally with shaft member 24, the number of components can be reduced, and the component cost and assembling cost can be reduced.

While the vehicle wind direction adjuster made by the present inventor has been specifically described based on the preferred embodiments, it is not intended to limit the present invention to the above-mentioned preferred embodiments but the present invention may be further modified within the scope and spirit of the invention defined by the appended claims.

REFERENCE SIGNS LIST

10 Vehicle wind direction adjuster
11 Case
12 Universal joint
13 Housing
14 Louver
22 First shaft
23 Second shaft
24 Shaft member
25 First turning supporter
26 Second turning supporter
28 First elastic body
29 Second elastic body

The invention claimed is:

1. A vehicle wind direction adjuster comprising:
a case having a cylindrical shape;
a housing having a cylindrical shape and turnably coupled to the case through a universal joint; and
a louver provided in the housing,
wherein the universal joint includes:
a shaft member including a first shaft and a second shaft orthogonal to the first shaft,
a first turning supporter coupled to the case and configured to turnably support the first shaft, and
a second turning supporter coupled to the housing and configured to turnably support the second shaft,
wherein a first elastic body is provided around the first shaft such that the first elastic body is interposed between the shaft member and the first turning supporter,
wherein a second elastic body is provided around the second shaft such that the second elastic body is interposed between the shaft member and the second turning supporter, and
wherein:
the first shaft is orthogonal to a central axis of the case,
the second shaft is further orthogonal to the central axis of the case,
the first turning supporter is further configured to turnably support the housing when the housing turns around the first shaft, and
the second turning supporter is further configured to turnably support the housing when the housing turns around the second shaft.

2. The vehicle wind direction adjuster according to claim 1, wherein the first elastic body and the second elastic body have different hardnesses or compression allowances.

3. The vehicle wind direction adjuster according to claim 1, wherein:
each of the shaft member, the first elastic body and the second elastic body is formed of a synthetic resin material; and
the first elastic body and the second elastic body are formed integrally with the shaft member.

\* \* \* \* \*